(12) United States Patent
Skaare (10) Patent No.: US 8,174,137 B2
(45) Date of Patent: May 8, 2012

(54) METHOD FOR THE DAMPING OF TOWER OSCILLATIONS IN WIND POWER INSTALLATIONS

(75) Inventor: Bjorn Skaare, Bergen (NO)

(73) Assignee: Statoilhydro ASA, Stavanger (NO)

( * ) Notice: Subject to any disclaimer, the term of this patent is extended or adjusted under 35 U.S.C. 154(b) by 435 days.

(21) Appl. No.: 12/377,896

(22) PCT Filed: Aug. 20, 2007

(86) PCT No.: PCT/NO2007/000291
§ 371 (c)(1),
(2), (4) Date: Mar. 11, 2009

(87) PCT Pub. No.: WO2008/023990
PCT Pub. Date: Feb. 28, 2008

(65) Prior Publication Data
US 2010/0045038 A1 Feb. 25, 2010

(30) Foreign Application Priority Data
Aug. 22, 2006 (NO) .................................. 20063744

(51) Int. Cl.
*H02P 9/04* (2006.01)
*F03D 9/00* (2006.01)
(52) U.S. Cl. ................ 290/44; 290/43; 290/45; 290/54; 290/55; 416/1; 416/7; 416/132 B
(58) Field of Classification Search .................... 290/43, 290/44, 54, 55; 415/1, 7, 4.1, 2.1; 416/1, 416/132 B, 7
See application file for complete search history.

(56) References Cited

U.S. PATENT DOCUMENTS
RE30,590 E * 4/1981 Blenkarn ...................... 114/265
(Continued)

FOREIGN PATENT DOCUMENTS
EP 1643122 A2 4/2006
(Continued)

OTHER PUBLICATIONS
EPO, Title: Notification of Transmittal of the International Preliminary Report on Patentability for PCT/NO2007/000291, Mar. 9, 2009, pp. 1-8.

(Continued)

*Primary Examiner* — John K Kim
(74) *Attorney, Agent, or Firm* — Sutherland Asbill & Brennan LLP (57) ABSTRACT

A method for controlling a wind turbine installation for the damping tower oscillations, in particular a buoyant wind turbine installation comprising a buoyant body, a tower arranged over the buoyant body, a generator mounted on the tower that is rotatable in relation to the wind direction and fitted with a wind turbine, and an anchor line arrangement connected to anchors or foundations on the sea bed. The tower oscillations are damped by the control with the blade angle controller in the constant power or RPM range of the wind turbine being performed by the rotor velocity (which is the input to the blade angle controller) being estimated in an estimator for the wind turbine. The input to the wind turbine estimator is the estimated incoming wind, so that the tower movements are not visible to the blade angle controller. Negative damping is thus not introduced into the system and the tower oscillations will be expediently damped, while there is also less variation in blade angle, thrust on the rotor and power supplied.

5 Claims, 8 Drawing Sheets

U.S. PATENT DOCUMENTS

| | | | | |
|---|---|---|---|---|
| 4,420,692 | A * | 12/1983 | Kos et al. | 290/44 |
| 4,435,647 | A * | 3/1984 | Harner et al. | 290/44 |
| 5,289,041 | A * | 2/1994 | Holley | 290/44 |
| 6,876,099 | B2 * | 4/2005 | Wobben | 290/44 |
| 6,891,280 | B2 * | 5/2005 | Siegfriedsen | 290/44 |
| 7,075,189 | B2 * | 7/2006 | Heronemus et al. | 290/44 |
| 2004/0108729 | A1 | 6/2004 | Wobben | |
| 2004/0169376 | A1 * | 9/2004 | Ruer et al. | 290/55 |
| 2006/0033338 | A1 | 2/2006 | Wilson | |
| 2006/0066111 | A1 | 3/2006 | Suryanarayanan et al. | |
| 2006/0082160 | A1 * | 4/2006 | Lee | 290/55 |
| 2008/0260514 | A1 * | 10/2008 | Nielsen et al. | 415/4.3 |
| 2010/0045038 | A1 * | 2/2010 | Skaare | 290/44 |

FOREIGN PATENT DOCUMENTS

| | | |
|---|---|---|
| EP | 1719910 A1 | 11/2006 |
| GB | 2117934 | 10/1983 |
| WO | 02075153 A1 | 9/2002 |

OTHER PUBLICATIONS

Tony Burton, et al., Title: "Wind Energy Handbook", John Wiley & Sons, Ltd., 2001, Chapter 8.3.5: Control of Tower Vibration, pp. 486-487.

* cited by examiner

METHOD FOR THE DAMPING OF TOWER OSCILLATIONS IN WIND POWER INSTALLATIONS

TECHNICAL FIELD

Figure 9:
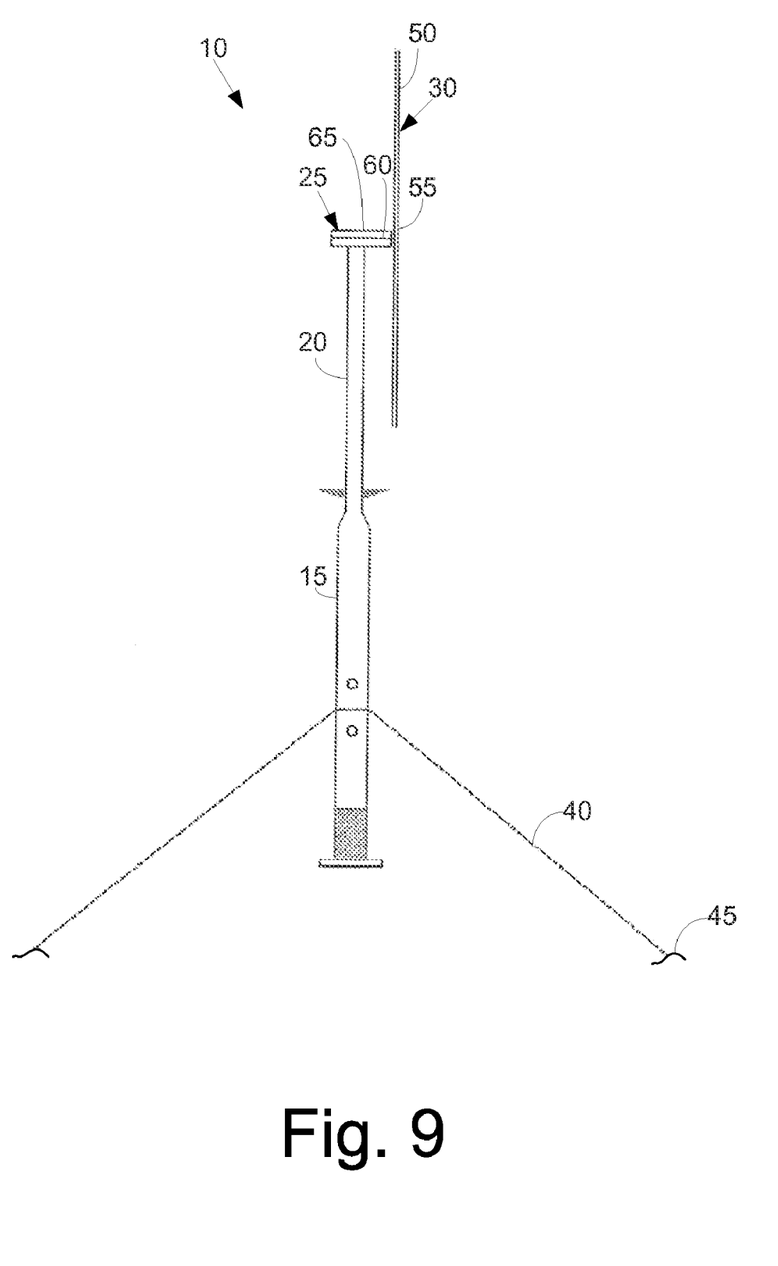
FIG. 9 is a schematic view of a wind turbine installation as may be described herein.

The present invention concerns a method for controlling a wind turbine installation 10 for the damping of tower oscillations, in particular a buoyant wind turbine installation comprising a buoyant body 15, a tower 20 arranged over the buoyant body, a generator 25 mounted on the tower that is rotatable in relation to the wind direction and fitted with a wind turbine 30, and an anchor line 40 arrangement connected to anchors or foundations on the sea bed 45. The generator is controlled, on the basis of the wind speed, by control of the blade angle of the turbine blades 50, by means of a controller, preferably in the constant power or RPM range of the wind turbine. A rotor 55, a shaft 60, and a nacelle 65 also are shown.

BACKGROUND OF THE INVENTION

The development of buoyant, anchored wind turbines that can be used at great depths will strongly enhance access to areas for the expansion of wind energy at sea. Current technology for wind turbines located at sea is considerably limited to permanently installed towers at low depths, under approximately 30 m.

Permanent installations at depths over 30 m generally result in technical problems and high costs. This has meant that, until now, sea depths of more than around 30 m have been regarded as technically and commercially unfavourable for the installation of wind turbines.

With buoyant solutions at greater sea depths, the foundation problem and costs associated with complicated, labour-intensive installations can be avoided.

A wind turbine that is mounted on a buoyant foundation will move on account of the forces from the wind and waves. A good wind turbine foundation design will ensure that the system's eigenperiods for rigid buoyant body movements (surge, sway, heave, roll, pitch and yaw) are outside the period range for sea waves, which is approximately 5-20 seconds.

SUMMARY OF THE INVENTION

There will still be forces that act in connection with the eigenperiods for the system (swell, non-linear wave forces, fluctuations in wind speed, current forces, etc.). If such forces are not to produce unacceptable movements, they must not be too large, and the system must have damping for the relevant periods.

The present invention represents a solution, more precisely a method, for effective damping of tower oscillation for wind turbine installations. The present invention is characterised by the features specified in the attached independent claim 1.

The dependent claims indicate an advantageous solution in connection with the present invention.

These and other features of the present application will become apparent to one of ordinary skill in the art upon review of the following detailed description when taken in conjunction with the drawings and the appended claims.

BRIEF DESCRIPTION OF THE DRAWINGS

The present invention will be described in further detail in the following using examples and with reference to the attached drawings, where.

DETAILED DESCRIPTION

Figure 1:
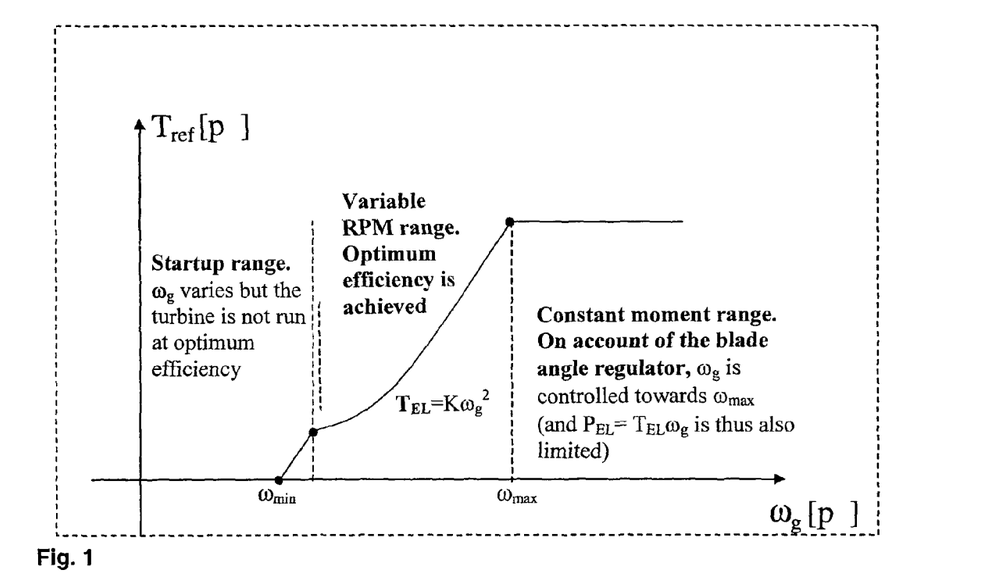
FIG. 1 shows a diagram with various RPM ranges for a wind turbine with RPM and rotor pitch control.

When the wind acts on a wind turbine installation, the forces from the wind will contribute to movements in the foundation. However, the forces from the wind turbine depend on how the turbine is controlled, i.e. how the RPM and the pitch of the turbine blades vary with wind velocity. The control algorithms will vary with the wind velocity. A typical control philosophy for land-based wind turbines is shown in FIG. 1. With reference to this Figure, it can be seen that:

In the startup range, small forces act on the wind turbine. The wind forces will have little effect on the movements. If the movements are affected by the wind forces, it is possible to control the turbine approximately as in the variable RPM range.

In the variable RPM range, there is an approximately constant pitch angle for the turbine blades. The aim is to control the RPM for the turbine so that maximum power can be produced at any time, given the momentary relative wind velocity against the turbine. The relative wind velocity consists of mean wind velocity, variation in wind velocity and the movement (velocity) of the tower. This means that there will be increased power and increased thrust from the turbine when the wind increases. In turn, if the system (the wind turbine, including the foundation) moves against the wind with a combined pitch and surge movement, this entails increased wind velocity for the turbine, and the thrust increases. This is equivalent to a damping force (a force that acts against the velocity). In this wind velocity range, the wind forces on the turbine will therefore contribute positive damping to the system. This will contribute to reduced movements in connection with the system's eigenperiods.

In the constant moment range, the turbine's rated power is reached. It is then usual to maintain approximately constant RPM and control the moment and thus the power by controlling the pitch angle of the turbine blades. The aim is to maintain approximately constant power. If the wind velocity increases, the pitch angle is increased in order to reduce the moment. This also produces reduced thrust despite the increased wind velocity. Unlike that which happens in the variable RPM range, the result is thus a negative damping effect. A standard control system will try to adjust all power variations that are due to changes in the relative wind velocity against the turbine. This is done by changing the blades' pitch angle so that the moment on the turbine is kept constant despite the variation in relative velocity. This will result in the wind turbine contributing negative system damping, which thus increases the tower's movement. This can produce unacceptably large movements.

With the present invention, it has been found that the control algorithms must be modified to prevent the negative link between control of the wind turbines and the system's movements. It is desirable to maintain approximately constant RPM and the moment in the "constant moment" range, but, using a wind turbine estimator, that will be described in further detail in the following, the turbine is still prevented from supplying negative damping.

Figure 2:
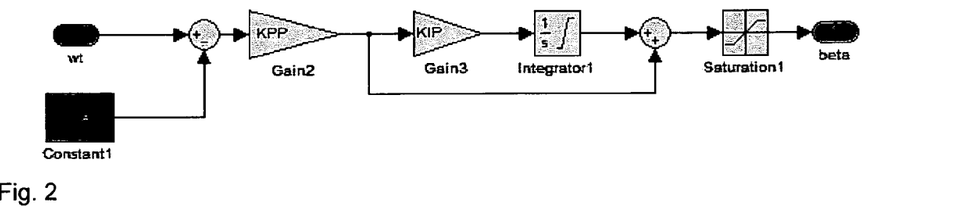
FIG. 2 shows a section of a conventional blade angle controller.

FIG. 2 shows a section of a blade angle controller, with proportional and integral control (PI). The input to the controller is the rotor velocity, $\omega_t$, and the output is the blade angle, $\beta$. This is the change required in the turbine blade angle to maintain constant power on the turbine when the relative wind velocity changes.

Figure 8:
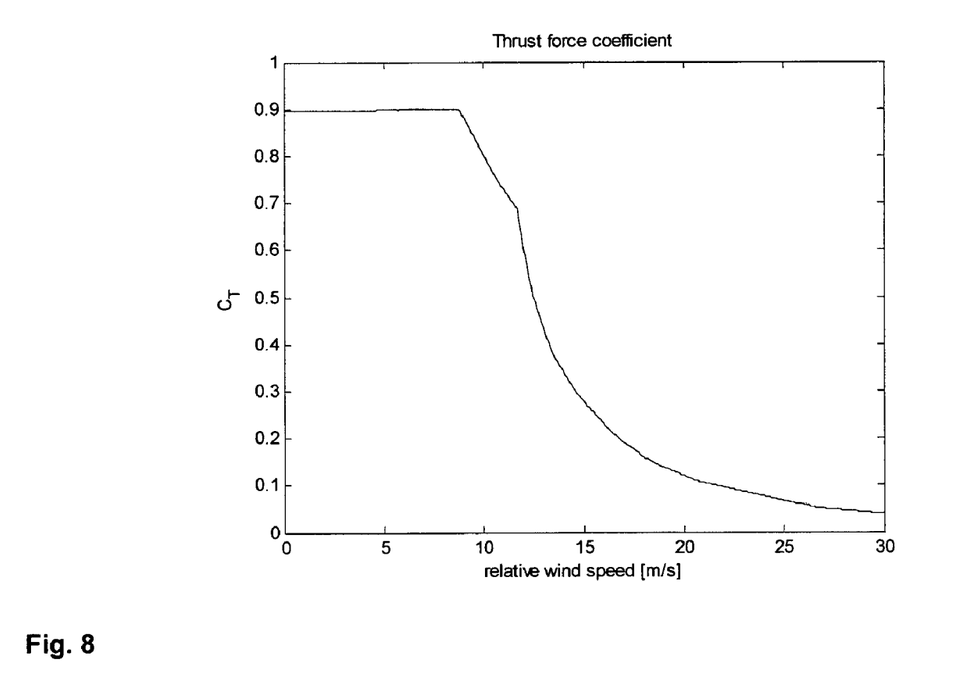
FIG. 8 shows a diagram of the relation between the coefficient of thrust of the rotor and the relative wind velocity between the wind and the turbine.

FIG. 8 shows a diagram with the relation between relative wind velocity and the coefficient of thrust for a conventional blade angle-controlled wind turbine in which the thrust $F_T$ is given as $$F_T = \frac{1}{2}\rho A C_T(\lambda, \beta) u_r |u_r|,$$

where $\rho$ is the density of air, A is the swept area of the rotor, $C_T$ is the coefficient of thrust of the turbine, $\lambda$ is the tip speed ratio, $\beta$ is the blade angle of the turbine and $u_r$ is the relative wind velocity between the turbine and the wind. This diagram shows that an increased relative velocity above the rated wind velocity may produce reduced thrust on the turbine. This results in the wind turbine being supplied negative damping when it moves forwards and backwards in the wind.

If the turbine's movements can be hidden from the blade angle controller, the coefficient of thrust will not be changed in the same way as a consequence of the movements of the turbine, and the turbine will supply positive damping to the system.

Figure 3:
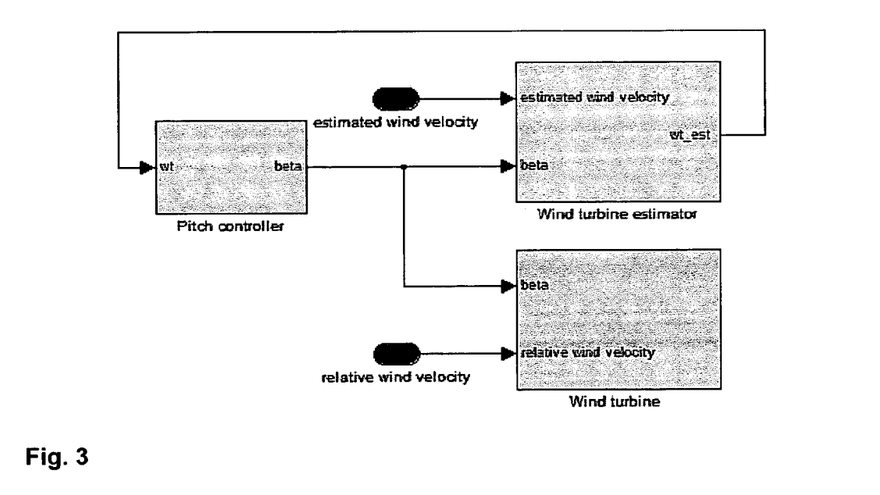
FIG. 3 shows a general outline of a system with a blade angle controller, wind turbine and wind turbine estimator.

To hide the turbine movements from the blade angle controller, it is possible to use a wind turbine estimator (see FIG. 3) in the form of a numerical model of the wind turbine in question. The wind turbine estimator runs in real time with the blade angle measured and the estimated incoming wind as the input. The estimated rotor velocity $\omega_{t\_est}$ will not be affected by the actual turbine's movements and is used as the input in the actual turbine's blade angle controller.

The numerical wind turbine model on which the wind turbine estimator is based will vary with different wind turbines and different levels of detail of the numerical model. An example of a simple numerical wind turbine model based on stationary relations is described in the following.

The power $P_{turb}$ transferred from the wind to the turbine is given by $$P_{turb} = \frac{1}{2} \cdot \rho \cdot C_p(\lambda, \beta) \cdot \pi \cdot r^2 \cdot u_t^3, \quad (1)$$

where
$u_t$—Resulting wind velocity on the turbine
$\rho$—Air density
$C_p(\lambda,\beta)$—Coefficient of efficiency of the turbine
$\lambda$—Turbine's tip speed ratio
$\beta$—Rotor blades' angle
r—Wind turbine's radius (length of the rotor blades)

This produces the following turbine moment on the shaft:

$$T_{turb} = \frac{P_{turb}}{\omega_t} = \frac{1}{2} \cdot \frac{1}{\omega_t} \cdot \rho \cdot C_p(\lambda, \beta) \cdot \pi \cdot r^2 \cdot u_t^3, \quad (2)$$

where
$\omega_t$—Turbine RPM

The shaft dynamics can also be expressed by the following three equations:

$$\dot{\omega}_t = \frac{1}{J_t}(T_{turb} - d_m \cdot (\omega_t - \omega_g) - k \cdot \theta_{twist}) \quad (3)$$

$$\dot{\omega}_g = \frac{1}{J_g}(k \cdot \theta_{twist} + d_m \cdot (\omega_t - \omega_g) - T_{EL}) \quad (4)$$

$$\dot{\theta}_{twist} = (\omega_t - \omega_g) \cdot \omega_N, \quad (5)$$

where
$\omega_g$—Generator RPM
$J_t$—Turbine's moment of inertia
$J_g$—Generator's moment of inertia
$T_{turb}$—Turbine moment
$T_{EL}$—Generator's electric countermoment
$d_m$—Shaft's damping
k—Shaft's rigidity
$\omega_N$—Nominal electric frequency
$\theta_{twist}$—Shaft's angle of twist It is assumed that the incoming wind velocity can be estimated using several methods, for example by combining measurements of the thrust on the rotor, the moment on the shaft and the acceleration of the nacelle.

A wind turbine estimator in which the tower movements are hidden from the blade angle controller is achieved by using the numerical model (1)-(5), with an estimated incoming wind velocity, $u_{t\_est}$, and actual (measured) blade angle, $\beta$, as the input. The remaining quantities in the model (1)-(5) can be expressed with underlined "est". The result from the wind turbine estimator (which is the input to the blade angle controller) is then the estimated turbine RPM $\omega_{t\_est}$.

Using the estimator leads to the turbine experiencing a relative wind velocity with greatly reduced influence from the tower's oscillations in relation to a situation in which the estimator is not used. In addition, the tower will vibrate physically considerably less. There will be less thrust on the rotor, less variation in blade angle and less variation in the power produced when the estimator is used.

Simulation Tests.

On the basis of the control solution as described above, simulation tests were carried out for a wind series with a mean wind velocity of 17 m/sec. and irregular waves with a significant wave height of 3.5 m and period of 9.8 s. The wind velocity was selected because the need for damping is greatest at such high wind velocities, i.e. when the turbines are operated in constant power mode. Two different turbine models were used in the simulations: a detailed model that represents the actual turbine and a simplified model that was used in the estimator (see FIG. 3). The estimated incoming wind velocity is the exact incoming wind velocity plus white noise.

FIGS. 4-7 show a selection of results from the simulation of wind series at 17 m/sec. mean wind velocity with and without the estimator for damping tower oscillations.

Figure 4:
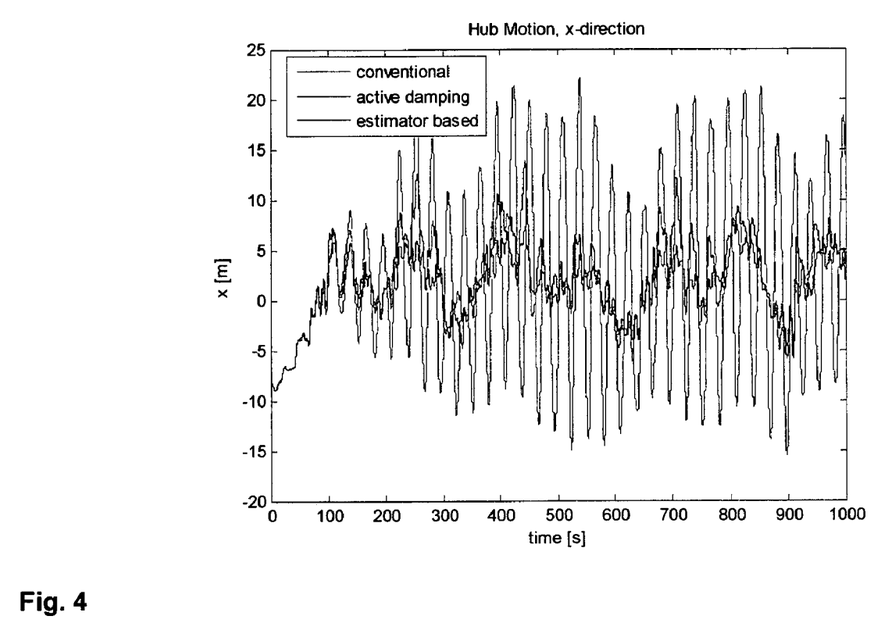
FIG. 4 shows diagrams based on simulation tests, with the estimator and conventional controlling, linked to horizontal displacement at the top of the tower with a mean wind velocity of 17 m/s and irregular waves with a significant wave height of 3.5 m and period of 9.8 s.
Figure 5:
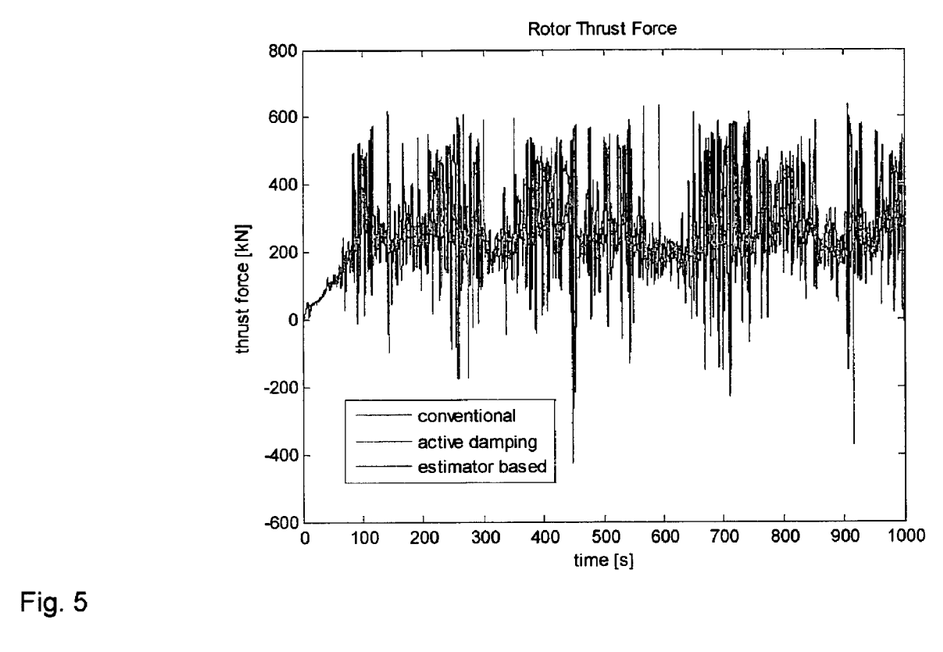
FIG. 5 shows diagrams based on simulation tests, with the estimator and conventional controlling, linked to thrust on the rotor with a mean wind velocity of 17 m/s and irregular waves with a significant wave height of 3.5 m and period of 9.8 s.
Figure 6:
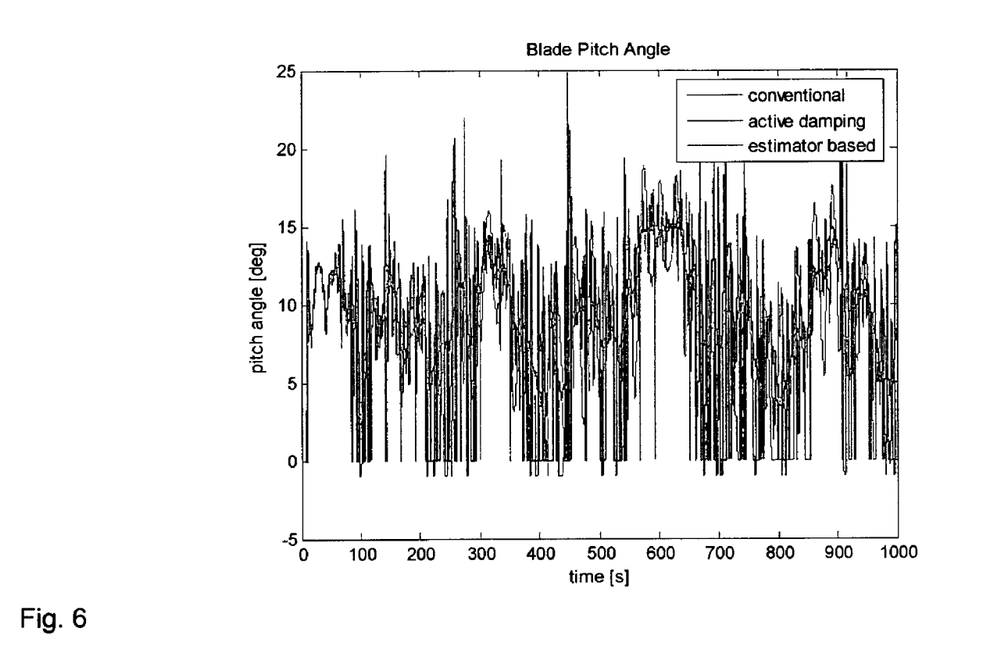
FIG. 6 shows diagrams based on simulation tests, with the estimator and conventional controlling, linked to the blade angle with a mean wind velocity of 17 m/s and irregular waves with a significant wave height of 3.5 m and period of 9.8 s.
Figure 7:
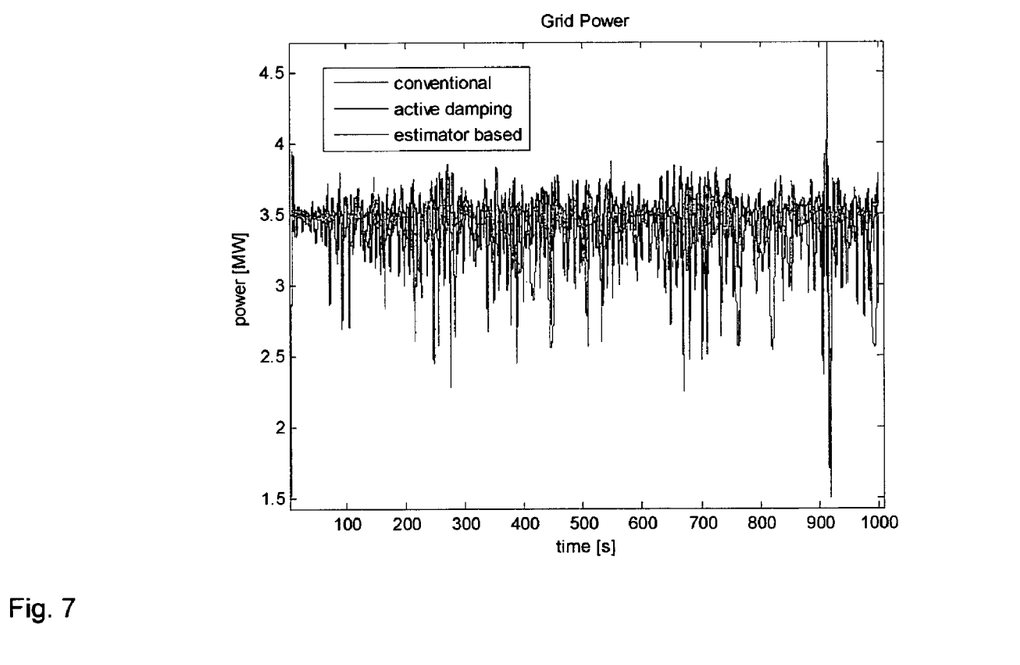
FIG. 7 shows a diagram based on simulation tests, with the estimator, stabiliser and conventional controlling, linked to the active power supplied to the grid with a mean wind velocity of 17 m/s and irregular waves with a significant wave height of 3.5 m and period of 9.8 s.

FIG. 4 shows that there are considerable tower oscillations when the turbine runs in constant power mode and the estimator is not used. This also results in large fluctuations in the thrust on the rotor (see FIG. 5), the blade angle (see FIG. 6) and the power supplied to the grid (see FIG. 7). The high amplitudes in the tower oscillations with conventional controller can be explained as follows:

In the constant RPM range, the thrust is reduced when the wind velocity increases. If the tower assumes a rearward velocity, the relative wind velocity that the tower experiences will be reduced. The blade angle (pitch) will be adjusted (increased) to maintain the moment and thus constant power. Thus the thrust will also increase despite the reduced relative wind velocity. Accordingly, when the tower moves at a velocity against the wind direction, the relative wind velocity will increase. The blade angle (pitch) will be adjusted (reduced) to reduce the moment. This will also reduce the thrust. This method of controlling the turbine will thus produce a variation in the thrust that acts in the same direction as the tower movement. I.e. negative damping. This will result in an amplification of the tower movement, in particular near the tower's resonance period in which the movement is controlled by damping.

If the estimator in accordance with the present invention is used, FIGS. 4-7 show that the tower oscillations are damped well, and the fluctuations in thrust, blade angle and power supplied are also reduced. The estimator thus produces the desired effect.

In summary, the estimator-based control (see FIG. 3) acts in such a way that the tower movements are not visible to the blade angle controller and negative damping is thus never introduced into the system. This is achieved by using a wind turbine estimator with estimated incoming wind velocity as the input. The input to the blade angle controller is the estimated rotational velocity based on the estimated incoming wind velocity instead of the actual rotational velocity, which is based on the actual relative wind velocity. The invention, as it is defined in the claims, is not limited to the examples described above. The present invention may, therefore, also be used for wind turbine towers in which the flexibility in the tower as such is relatively high, or a combination of a buoyant wind turbine installation and a flexible tower.

It should be apparent that the foregoing relates only to the preferred embodiments of the present application and that numerous changes and modification may be made herein by one of ordinary skill in the art without departing from the general spirit and scope of the invention as defined by the following claims and the equivalents thereof.

The invention claimed is:

1. A method of controlling a buoyant wind turbine installation, comprising:
providing the wind turbine installation;
wherein the wind turbine installation comprises a buoyant body, a tower arranged over the buoyant body, a generator mounted on the tower that is rotatable in relation to the wind direction and fitted with a wind turbine, and an anchor line arrangement connected to anchors or foundations on a sea bed, wherein the generator is controlled in the constant power or RPM range by controlling the blade angle of the turbine blades by means of a blade angle controller;
using a numerical model with the estimated incoming wind velocity as its input, to estimate the rotor velocity; and
inputting the estimated rotor velocity into the blade angle controller, the blade angle controller controlling the blade angle based on the inputted estimated rotor velocity;
whereby tower movements are not visible to the blade angle controller such that negative damping is not introduced into the installation.

2. A method as claimed in claim 1, wherein the actual measured blade angle is also input into the numerical model.

3. A method as claimed in claim 1, wherein the estimated incoming wind velocity is estimated by combining measurements of the thrust on a rotor, the moment on a shaft and the acceleration of a nacelle, of the wind turbine installation.

4. A method as claimed in claim 1, wherein the numerical model runs in real time.

5. A method of controlling a buoyant wind turbine installation, wherein the wind turbine installation comprises a buoyant body, a tower arranged over the buoyant body, a generator mounted on the tower that is rotatable in relation to the wind direction and fitted with a wind turbine, and an anchor line arrangement connected to anchors or foundations on a sea bed, wherein the generator is controlled in the constant power or RPM range by controlling the blade angle of the turbine blades by means of a blade angle controller;
characterised in that the method comprises the following steps:
using a numerical model with the estimated incoming wind velocity as its input, to estimate the rotor velocity; and
inputting the estimated rotor velocity into the blade angle controller, the blade angle controller controlling the blade angle based on the inputted estimated rotor velocity;
whereby tower movements are not visible to the blade angle controller such that negative damping is not introduced into the installation;
wherein the numerical model is based on the following equations:

$$P_{turb} = \frac{1}{2} \cdot \rho \cdot C_p(\lambda, \beta) \cdot \pi \cdot r^2 \cdot u_t^3;$$

$$T_{turb} = \frac{P_{turb}}{\omega_t};$$

$$\dot{\omega}_t = \frac{1}{J_t}(T_{turb} - d_m \cdot (\omega_t - \omega_g) - k \cdot \theta_{twist});$$

$$\dot{\omega}_g = \frac{1}{J_g}(k \cdot \theta_{twist} + d_m \cdot (\omega_t - \omega_g) - T_{EL});$$

and $$\dot{\theta}_{twist} = (\omega_t - \omega_g) \cdot \omega_N;$$

wherein $P_{turb}$ is the power transferred from the wind to the turbine, $u_t$ is the resulting wind velocity on the turbine, $\rho$ is the air density, $C_P(\lambda,\beta)$ is the coefficient of efficiency of the turbine, $\lambda$ is the turbine's tip speed ratio, $\beta$ is the angle of the rotor blades, r is the wind turbine radius, which is the length of the rotor blades, $\omega_t$ is the turbine RPM, $\omega_g$ is the generator RPM, $J_t$ is the moment of inertia of the turbine, $J_g$ is the moment of inertia of the generator, $T_{turb}$ is the turbine moment, $T_{EL}$ is the generator's electric countermoment, $d_m$ is the shaft's damping, k is the shaft's rigidity, $\omega_N$ is the nominal electric frequency and $\theta_{twist}$ is the shaft's angle of twist.

* * * * *